(12) United States Patent
Kim et al.

(10) Patent No.: US 8,279,960 B2
(45) Date of Patent: Oct. 2, 2012

(54) MULTIPLE-INPUT MULTIPLE-OUTPUT COMMUNICATION METHOD AND MULTIPLE-INPUT MULTIPLE-OUTPUT COMMUNICATION SYSTEM OF ENABLING THE METHOD

(75) Inventors: Jun Mo Kim, Seoul (KR); Chang Soon Park, Chungcheongbuk-do (KR); Ki-Hong Park, Suwon-si (KR); Young-Chai Ko, Seoul (KR); Jung Hoon Suh, Yongin-si (KR); Sung Jin Kim, Suwon-si (KR)

(73) Assignees: Samsung Electronics Co., Ltd., Suwon-Si (KR); Korea University Industrial & Academic Collaboration Foundation, Seoul (KR)

( * ) Notice: Subject to any disclaimer, the term of this patent is extended or adjusted under 35 U.S.C. 154(b) by 1188 days.

(21) Appl. No.: 12/107,265

(22) Filed: Apr. 22, 2008

(65) Prior Publication Data

US 2008/0292012 A1 Nov. 27, 2008

Related U.S. Application Data

(60) Provisional application No. 60/939,765, filed on May 23, 2007.

(30) Foreign Application Priority Data

| Jun. 11, 2007 | (KR) | 10-2007-0056656 |
| Oct. 8, 2007 | (KR) | 10-2007-0101063 |
| Dec. 21, 2007 | (KR) | 10-2007-0135843 |

(51) Int. Cl.
*H04L 1/02* (2006.01)

(52) U.S. Cl. .......................................... 375/267

(58) Field of Classification Search ............ 375/267, 375/299, 347, 349, 358, 260; 700/53; 455/101, 455/132–141, 69
See application file for complete search history.

(56) References Cited

U.S. PATENT DOCUMENTS

| 7,006,810 | B1 | 2/2006 | Winters et al. |
| 7,657,244 | B2 * | 2/2010 | Niu et al. .................. 455/277.1 |
| 7,684,761 | B2 * | 3/2010 | Hottinen ........................ 455/69 |
| 7,715,863 | B2 * | 5/2010 | Khojastepour et al. ....... 455/522 |
| 2003/0130003 | A1 * | 7/2003 | Won ............................. 455/522 |
| 2005/0181737 | A1 * | 8/2005 | Kobayashi et al. ............. 455/69 |
| 2006/0104340 | A1 | 5/2006 | Walton et al. |
| 2008/0013644 | A1 * | 1/2008 | Hugl et al. .................... 375/295 |

FOREIGN PATENT DOCUMENTS

| JP | 2006-180320 | 7/2006 |
| KR | 10-2003-0059687 | 7/2003 |
| KR | 10-2006-0048586 | 5/2006 |

OTHER PUBLICATIONS

Molisch et al. MIMO Systems with Antenna Selection—An Overview, p. 1-22, 2004.*

* cited by examiner

*Primary Examiner* — Sam K Ahn
(74) *Attorney, Agent, or Firm* — NSIP Law

(57) ABSTRACT

A Multiple-Input Multiple-Output (MIMO) communication system and method. The MIMO communication system includes: an antenna number determination unit to determine a number of active antennas among a plurality of transmitting antennas based on a power of a transmission signal wherein the number of active antennas is at least one and the at least one active antenna transmits the transmission signal; and a beam generator to generate the transmission signal corresponding to the number of active antennas by using channel information wherein the channel information is fed back from each of a plurality of user terminals.

29 Claims, 8 Drawing Sheets

<MRC SCHEME, ANTENNA SELECTION COMBINING SCHEME>

MULTIPLE-INPUT MULTIPLE-OUTPUT COMMUNICATION METHOD AND MULTIPLE-INPUT MULTIPLE-OUTPUT COMMUNICATION SYSTEM OF ENABLING THE METHOD

CROSS-REFERENCE TO RELATED APPLICATIONS

This application claims the benefit of a U.S. Provisional Application No. 60/939,765, filed in the U.S. Patent and Trademark Office on May 23, 2007, and of Korean Application No. 2007-56656, filed on Jun. 11, 2007, Korean Application No. 2007-101063, filed in the Korean Intellectual Property Office on Oct. 8, 2007, and Korean Application No. 2007-135843, filed in the Korean Intellectual Property Office on Dec. 21, 2007, the disclosures of which are incorporated herein by reference.

BACKGROUND OF THE INVENTION

1. Field of the Invention

Aspects of the invention relate to a multi-user Multiple-Input Multiple-Output (MIMO) communication, and more particularly, to a MIMO communication system and method that can control a transmitting antenna based on a power of a transmission signal.

2. Description of the Related Art

Currently, research to provide a voice service and various types of multimedia services and to support high-quality and high-speed data transmission is quite active. For example, research on a Multiple-Input Multiple-Output (MIMO) scheme using a plurality of channels in a spatial area is a rapidly advancing technology. The MIMO scheme increases a number of channel bits within a limited frequency resource using multiple antennas and thereby provides a high data transmission rate. The MIMO scheme uses multiple transmitting/receiving antennas in a wireless channel environment and thus theoretically provides channel capacity that is in proportion to the smaller of the number of transmitting antennas and the number of receiving antennas. Research to increase the overall channel capacity of a multi-user MIMO system in a multi-user environment where one base station supports a plurality of terminals is also quite active.

In an uplink of the multi-user MIMO system, a multi-user transmits data to a base station. In a downlink of the multi-user MIMO system, the base station transmits data to the multi-user. The multi-user MIMO system is different from a single-user based MIMO system in that no cooperation is allowed between users.

In the multi-user MIMO system, a user terminal generally feeds back information about a quantized channel to a base station. When the base station transmits a precoded signal based on fed back channel information, there is a difference between an actual channel vector and a channel vector corresponding to the channel information. Accordingly, an error occurs in a preceding process due to the difference. Specifically, when a signal is transmitted at a high power, a data transmission rate may be reduced due to a noise effect caused by the error.

Channel information, preferably including a larger number of bits, is conventionally fed back to reduce the error. However, when the amount of feedback channel information increases, it also may increase overhead in the communication system. Accordingly, there is a need for a MIMO system and method that can achieve a high data rate with a reasonable amount of feedback channel information.

SUMMARY OF THE INVENTION

Aspects of the invention provide a Multiple-Input Multiple-Output (MIMO) communication system and method that can variably determine a number of transmitting antennas based on a power of a transmission signal and thereby can effectively transmit more data.

Other aspects of the invention also provide a MIMO communication system and method that can improve a data transmission rate even when a power of a transmission signal is relatively high.

Additional aspects of the invention also provide a MIMO communication system and method that can use a relatively smaller number of transmitting antennas even when a signal-to-noise ratio (SNR) is increased, and thereby can more effectively transmit data.

Additional aspects of the invention also provide a MIMO communication system and method that can use a relatively smaller number of transmitting antennas and thereby can improve a data transmission rate and also can use relatively fewer hardware resources.

Additional aspects of the invention also provide a MIMO communication system and method that can improve a data transmission rate based on a power of a transmission signal, and a number of user terminals even when a number of bits for the feedback of channel information is limited.

Additional aspects of the invention also provide a MIMO communication system and method that can generate a transmission signal using a zero-forcing beamforming algorithm and thereby can provide a communication environment where relatively less interference exists.

According to an aspect of the invention, a MIMO communication system is provided. The system includes an antenna number determination unit to determine a number of active antennas among a plurality of transmitting antennas based on a power of a transmission signal, wherein the number of active antennas is at least one and the at least one active antenna transmits the transmission signal; and a beam generator to generate the transmission signal corresponding to the number of active antennas using channel information fed back from each of a plurality of user terminals.

According to another aspect of the invention, a MIMO communication system is provided. The system includes a beam generator to generate a transmission signal using channel information fed back from each of a plurality of user terminals; and an antenna selector to select at least one active antenna from a plurality of transmitting antennas based a power of the transmission signal, wherein the at least one active antenna transmits the transmission signal.

According to still another aspect of the invention, a MIMO communication method is provided. The method includes determining a number of active antennas among a plurality of transmitting antennas based on a power of a transmission signal, wherein the number of active antennas is at least one and the at least one active antenna transmits the transmission signal; and generating the transmission signal corresponding to the number of active antennas using channel information fed back from each of a plurality of user terminals.

According to yet another aspect of the invention, a MIMO communication method is provided. The method includes generating a transmission signal using channel information fed back from each of a plurality of user terminals; and selecting at least one active antenna from a plurality of transmitting antennas based on a power of the transmission signal, wherein the at least one active antenna transmits the transmission signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
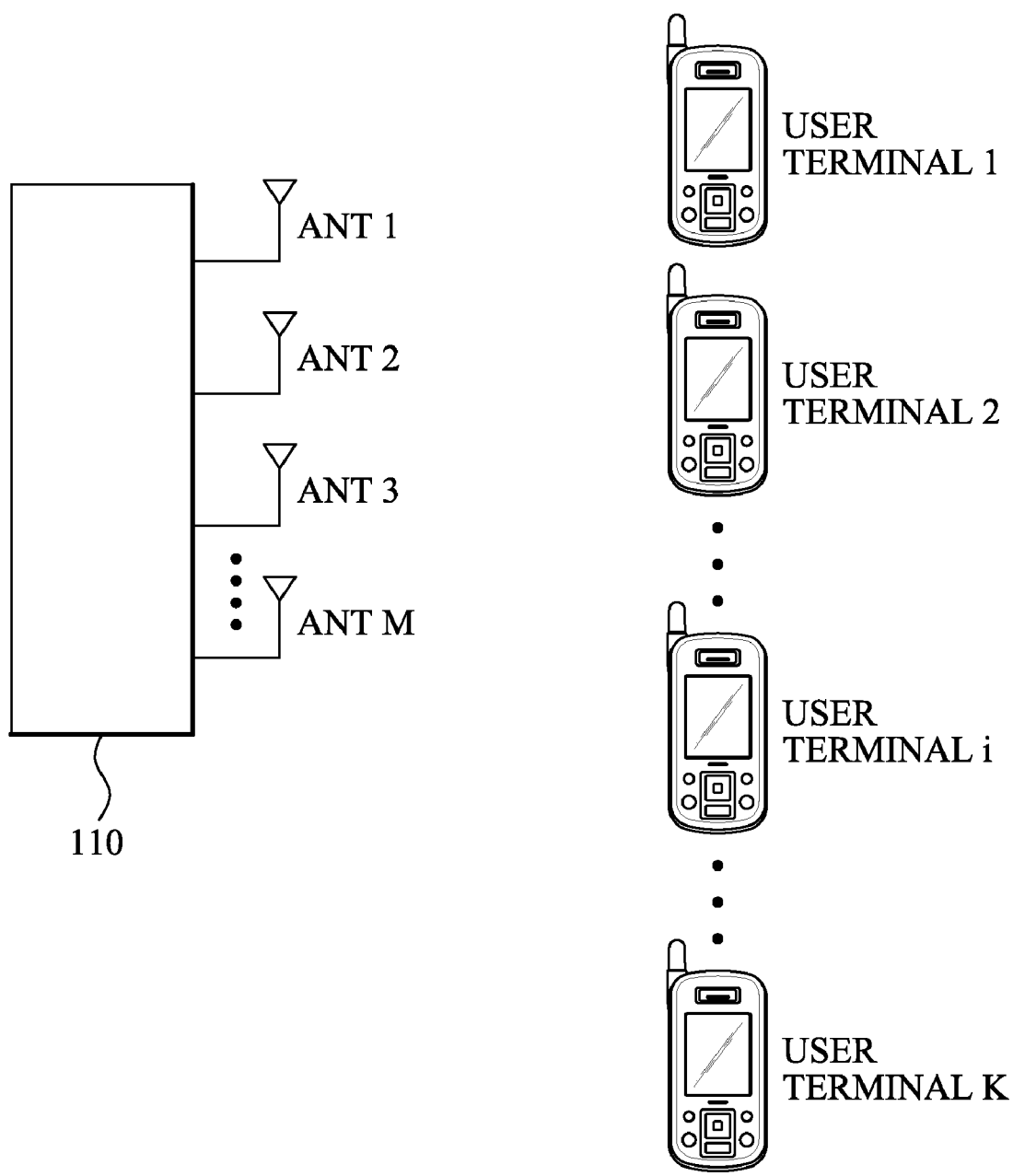
FIG. 1 illustrates an example of a MIMO communication system according to an embodiment of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows an example of a Multiple-Input Multiple-Output (MIMO) communication system according to an embodiment of the invention. A base station 110 includes M transmitting antennas (ANT 1, ANT 2, ANT 3, ..., ANT M). K user terminals (user terminal 1, user terminal 2, user terminal 3, ..., user terminal K) are also provided.

A channel is formed between each of the antennas and each of the user terminals for data communication. Generally, the channel may be represented as a channel matrix H. A relationship between a received signal of a user terminal side and a transmission signal of a transmitting antenna side is represented by the following Equation 1:

$$Y = H \cdot X + N \quad (1),$$

where Y is a vector with respect to signals received by the user terminal side, X is a vector with respect to signals transmitted from the transmitting antenna side, and N is noise.

When a transmitting end is aware of information concerning the channel matrix, the transmission signal X may be effectively transmitted to the user terminal. When X, in which a data stream S is precoded, is generated according to the following Equation 2, the user terminal may receive the data stream S more effectively and without interference from another user terminal. Equation 1 may be represented by the following Equation 2:

$$Y = H \cdot \{H^T \cdot (H \cdot H^T)^{-1} \cdot D \cdot S\} + N \quad (2).$$

When S is the data stream to be transmitted, the data stream S is precoded using $H^T \cdot (H \cdot H^T)^{-1} \cdot D$. Here, D is a diagonal matrix to normalize a determinant of $H^T \cdot (H \cdot H^T)^1$.

The channel state between the base station 110 and each of the user terminals varies based on time and space. Accordingly, the base station 110 may periodically check channel information. Each of the user terminals periodically identifies the channel information using a pilot signal or the like, and feeds the identified channel information back to the base station 110. Accordingly, the base station 110 precodes the data stream S using the channel information fed back from each of the user terminals. If each of the user terminals calculates a channel vector and feeds back results of the calculation to the base station 110, the amount of feedback data may be significantly increased.

Furthermore, each of the user terminals may pre-store information of multiple vectors. Each of the user terminals may calculate a channel vector and then select from the stored vectors a vector that is nearest to the direction of the calculated channel vector. Each of the user terminals may feed back information about the selected vector. Each of the user terminals may feed back only an index associated with a vector that is selected from the stored vectors. Accordingly, the amount of feedback data of each user terminal may be significantly reduced.

As used herein, B is the number of bits of data that the user terminals feed back to the base station 110. The user terminals may feed back B-bit data and thus the user terminals may pre-store $2^B$ vectors. When each of the user terminals calculates a channel vector using a pilot signal or the like, each of the user terminals may select a vector that is nearest to the calculated channel vector from the $2^B$ vectors, and feed back only an index associated with the selected vector to the base station 110. Accordingly, the base station 110 may select a channel vector corresponding to the index from the $2^B$ vectors using the fed back index, and also may generate a beamforming vector based on the selected channel vector. The base station 110 may generate, according to the above process, a transmission signal X in which a data stream S is beamformed. Each of the user terminals may effectively feed back channel information using relatively fewer bits.

The channel matrix H may be represented by the following Equation 3:

$$H^T = [h_1 h_2 \ldots h_k] \quad (3),$$

where H is a K×M matrix, M is the number of transmitting antennas of the base station 110, and K is the number of user terminals.

In the present specification, the user terminal includes one antenna. However, it is only for convenience of description and the invention is not limited thereto. For example, the user terminal may have a plurality of antennas, and the user terminal may output a scalar value by performing an inner product calculation with respect to vectors received by the plurality of antennas and a vector corresponding to a linear filter. In this case, an effective channel is the same as a channel when the user terminal has one antenna.

A vector $h_i$ with respect to a channel of an $i^{th}$ user terminal may be an M×1 channel vector. The vector $h_i$ may be an $i^{th}$ column vector of $H^T$ that is a transpose matrix of the channel matrix.

A value $y_i$ is a received signal of the $i^{th}$ user terminal, and x is a transmission signal of the transmitting antenna. The value $y_i$ may be represented by the following Equation 4:

$$y_i = h_i^T x + n_i \qquad (4)$$

where i=1, 2, 3 ... K, and $n_i$ is noise that occurs in the $i^{th}$ user terminal.

The received signal $y_i$ of the $i^{th}$ user terminal is the same as a value obtained by adding the noise $n_i$ and the results of the multiplication of the channel vector with respect to the channel with the $i^{th}$ user terminal and the transmission signal x of the transmitting antenna.

The transmission signal x has a relationship as shown in the above Equation 4, and is transmitted to the user terminal via a channel using transmitting antennas of the base station 110. The transmission signal x of Equation 4 may be represented by the following Equation 5:

$$x = \sum_{j=1}^{K} v_j \cdot s_j. \qquad (5)$$

The transmission signal x may be generated by preceding the data stream S. $v_j$ is a $j^{th}$ column vector of a matrix, $H^T \cdot (H \cdot H^T)^{-1} \cdot D$, and is also a beamforming vector.

By combining Equation 4 and Equation 5, $y_i$ may be represented by the following Equation 6:

$$y_i = \sum_{j=1}^{K} h_i^T \cdot v_j \cdot s_j + n_i. \qquad (6)$$

Equation 6 may be represented by the following Equation 7:

$$y_i = h_i^T \cdot v_i \cdot s_i + \sum_{j=1, j \neq i}^{K} h_i^T \cdot v_j \cdot s_j + n_i, \qquad (7)$$

where $$\sum_{j=1, j \neq i}^{K} h_i^T \cdot v_j \cdot s_j + n_i$$

may be interpreted as noise by the $i^{th}$ user terminal.

If it is possible to force $h_i^T \cdot v_j$ to zero, a sum of interference and noise may be reduced to $n_i$. In this case, $v_j$ that is orthogonal to the channel vector formed in the $i^{th}$ user terminal may be selected. When $h_i^T$ is orthogonal to $v_j$, $h_i^T \cdot v_j$ becomes zero. When the base station 110 transmits a data stream to the $i^{th}$ user terminal, and the data stream is precoded to the beamforming vector $v_j$ that is orthogonal to all channels excluding the channel formed with the $i^{th}$ user terminal, it is referred to as "zero-forcing beamforming."

The beamforming vector $v_j$ is also generated using channel information that is fed back from each of the user terminals. A plurality of vectors that can be a channel vector or a channel direction vector may be pre-stored in the user terminals. When the base station 110 is aware of the precise channel direction vector of all user terminals, an $i^{th}$ beamforming vector may be orthogonal to all user terminals other than the $i^{th}$ user terminal. The $i^{th}$ beamforming vector is calculated by the base station 110 through the zero-forcing beamforming scheme. However, each of the user terminals feeds back only an index of a vector that is nearest to a channel vector direction of a corresponding user terminal among the plurality of stored vectors. Accordingly, an error may occur, referred to as a quantization error. The quantization error occurs during a process of feeding back channel information and affects a zero-forcing beamforming process. Accordingly, the $i^{th}$ beamforming vector that is generally generated by the base station 110 causes little interference while not being perfectly orthogonal to channels, excluding the $i^{th}$ user terminal.

When a signal is transmitted at a relatively low power, the quantization error may be disregarded. However, when a signal is transmitted at a relatively high power, the quantization error may not be disregarded. When increasing a number of bits of feedback data of the user terminal, the quantization error may be reduced, since more vectors may be stored in the base station 110 or the user terminal as the number of bits of feedback data increases. As the number of bits of feedback data increases, a total data transmission rate of data to be transmitted from the transmitting antennas to the user terminals increases. An increase in the number of bits of feedback data of the user terminal may increase overhead in the communication system. Variably changing the number of bits also creates burdens on a frame structure design.

When the amount of feedback data of the user terminal is B bits, the number of user terminals is K, the number of transmitting antennas is M, and a signal-to-noise ratio (SNR) of the transmission signal is P, and the relationship among B, K, M, and P is given by Equation 8 described below, loss caused by the quantization error may be maintained to be below a certain level. When the number of bits of feedback data B increases in proportion to an increase in a power of the transmission signal, the loss caused by the quantization error may be controlled. The power P of the transmission signal is a concept of including the SNR of the transmission signal. As the power P of the transmission signal increases, the SNR of the transmission signal increases and as the power P of the transmission signal decreases, the SNR of the transmission signal decreases.

When the number of bits of feedback data B continuously increases as the power of the transmission signal increases, a preferable data transmission rate (transmission rate when the base station 110 is accurately aware of channel information without the quantization error) versus a data transmission rate loss may be maintained to be below the certain level. The relationship among B, K, M, and P is represented by the following Equation 8:

$$B + \log_2 K = (M-1)\log_2 P + c \qquad (8),$$

where C is a constant.

Referring to the above Equation 8, when B and K are uniform, that is, when the number of bits of feedback data B is maintained to be uniform, the loss caused by the quantization error may be controlled by adjusting the number of transmitting antennas according to a change in the SNR or the power of the transmission signal.

Figure 2:
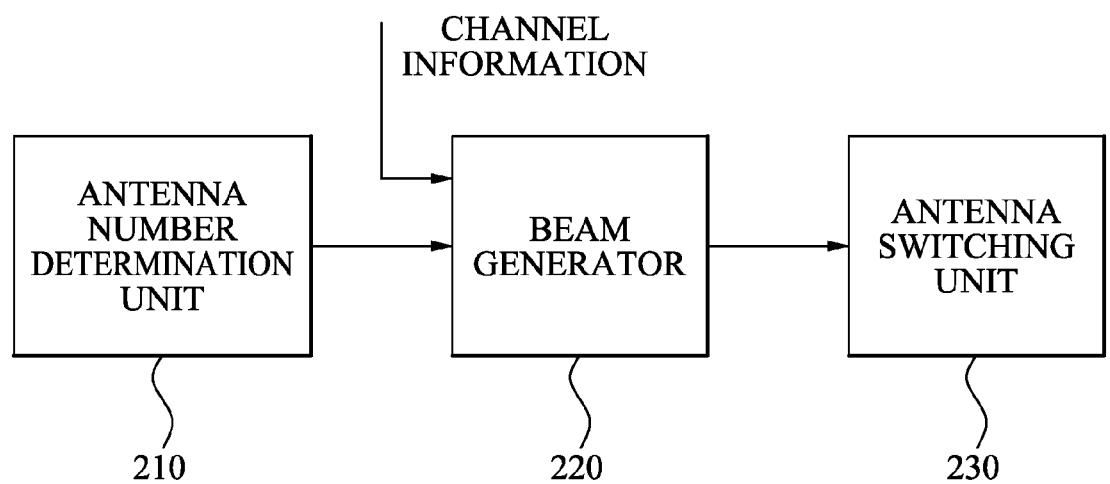
FIG. 2 is a block diagram illustrating an internal configuration of a MIMO communication system according to an embodiment of the invention.

FIG. 2 is a block diagram of an internal configuration of a MIMO communication system 200 according to an aspect of the invention. The MIMO communication system 200 includes an antenna number determination unit 210, a beam generator 220, and an antenna switching unit 230. According to other aspects of the present invention, the MIMO communication system 200 may include additional and/or different units. Similarly, the functionality of two or more of the above units may be combined into a single component.

The antenna number determination unit 210 determines a number of active antennas among a plurality of transmitting antennas based on a power of a transmission signal. The number of active antennas is at least one and the at least one active antenna transmits the transmission signal. The power of the transmission signal may be pre-set in a transmitting end. Referring again to the above Equation 8, the number of bits of feedback data B to be transmitted from the user terminal to the base station 110 may be fixed to a certain value. In this case, M transmitting antennas should be reduced to achieve a high SNR P.

Therefore, according to an aspect of the invention, the antenna number determination unit 210 may reduce the number of active antennas as the power of the transmission signal increases. As the number of the transmission signals increases, the data transmission rate may be further improved by transmitting a transmission signal with a relatively smaller number of active antennas. When the power of the transmission signal is above a particular level, it is possible to reduce interference occurring between the active antennas by using a relatively smaller number of active antennas. This process enables an improved data transmission rate.

The antenna number determination unit 210 may determine the number of active antennas based on at least one of an SNR, the number of the plurality of user terminals, and a number of bits of the channel information, in addition to the power of the transmission signal. The SNR may include the power of the transmission signal, since the SNR indicates the power when noise is normalized to a certain value. The antenna number determination unit 210 may also increase the number of active antennas as the number of bits of channel information decreases. The antenna number determination unit 210 may increase the number of active antennas as the number of user terminals increases.

The beam generator 220 generates the transmission signal corresponding to the number of active antennas using channel information fed back from each of a plurality of user terminals. For example, four transmitting antennas may be provided. In this case, the antenna number determination unit 210 may determine the number of active antennas as two among four transmitting antennas, based on the power of the transmission signal. The transmission signal transmitted via two active antennas has an improved data transmission rate in comparison to the transmission signal transmitted via four transmitting antennas.

When four transmitting antennas are provided and the number of active antennas is three, the beam generator 220 may generate the transmission signal as though the number of transmitting antennas were three. The user terminals that receive the transmission signal via the three active antennas feed back channel information as though the number of transmitting antennas were three.

Since the dimension of the beamforming vector may change according to the number of active antennas, user terminals may pre-store a plurality of codebooks. For example, for cases where the number of active antennas is four, three, two, and one, codebooks A, B, C, and D for the respective cases may be pre-stored in the user terminals. The dimensions of vectors included in the codebooks A, B, C, and D are 4×1, 3×1, 2×1, and 1×1 respectively. The user terminals may select any one codebook from the codebooks A, B, C, and D according to the number of active antennas, and may select at least one vector from vectors included in the selected codebook. The user terminals feed back channel information. The channel information may include index information of the selected vector.

When the number of transmitting antennas is M and the number of bits of channel information is B, the antenna number determination unit 210 may determine the number of active antennas as M−L less than M, based on the power of the transmission signal. The beam generator 220 may generate an M−L dimensional transmission signal corresponding to the determined M−L active antennas using an M−L dimensional beamforming vector. The portion of the transmission signal corresponding to a remaining dimension L may be set to zero.

When the number of transmitting antennas is M and the number of bits of channel information is B, the user terminals use an $M \times 2^B$ codebook. According to an aspect of the invention, the user terminals may use an $(M-L) \times 2^B$ codebook corresponding to the number of active antennas. The user terminals may select one active codebook from a plurality of pre-stored codebooks according to the number of active antennas, which is pre-determined, for example, M−L. In this case, the dimension of vectors that are included in the active codebook is (M−L). The channel information fed back to the base station by the user terminals may include information about at least one index of a vector among vectors included in the active codebook.

The antenna number determination unit 210 may determine the number of active antennas using a virtual antenna scheme. The antenna number determination unit 210 may determine the number of active antennas so that a state of an effective channel may be maintained.

Under the assumption that M transmitting antennas exist, if the virtual antenna scheme is used, the number of active antennas is also determined as M. Although all the M transmitting antennas transmit signals, an effect analogous to signal transmission by (M−L) antennas may be obtained. Each of the (M−L) antennas is referred to as a virtual antenna.

When all the M transmitting antennas are determined as active antennas, signals transmitted by the M transmitting antennas are $X_{out}$, and signals transmitted by (M−L) virtual antennas are $X_{in}$. The dimension of $X_{out}$ is M×1 and the dimension of $X_{in}$ is (M−L)×1. The relation between $X_{out}$ and $X_{in}$ may be represented by the following Equation 9:

$$X_{out} = P X_{in} \qquad (9).$$

P is an M×(M−L) matrix. The effective channel is the same as the multiplication of the matrix P and the channel vector. Therefore, when M active antennas transmit signals via a real channel and when (M−L) virtual antennas transmit signals via the effective antennas, user terminals receive the same signals.

According to an aspect of the invention, although the number of physical active antennas that substantially transmit signals changes using the virtual antenna scheme, the same effect may be obtained from the user terminals. However, although the number of physical active antennas changes using the virtual antenna scheme, the effective channel that is formed between the user terminals and the base stations does not change.

When using the virtual antenna scheme, the power assigned to each active antenna may be readily controlled. Each user terminal quantizes information about the effective channel and feeds back the quantized information to the base station. Accordingly, the quantization error may be reduced, which results in an improved data transmission rate.

The beam generator 220 may generate the transmission signal using a zero-forcing beamforming algorithm. The beam generator 220 may generate the transmission signal using the zero-forcing beamforming algorithm to correspond to the determined number of active antennas. Descriptions related thereto have been described above and thus will be omitted here.

The feedback channel information may include any one of channel state information and channel direction information. For example, when the transmission signal is generated using the above-described zero-forcing beamforming algorithm, the base station may receive the fed back channel direction information and thereby identify a channel direction. Accordingly, since the base station may identify the channel direction, the base station may generate a beamforming vector that is orthogonal to a channel vector.

When the antenna number determination unit 210 determines the M−L transmitting antennas as active antennas among the M transmitting antennas, the user terminal may feed back to the beam generator 220 channel information about channels formed from the M−L active antennas.

Although not shown in FIG. 2, the beam generator 220 may include a beamforming vector generator to generate a beamforming vector based on the channel information, and a transmission signal generator to generate the transmission signal using the beamforming vector. For example, the beamforming vector generator may generate a zero-forcing beamforming vector based on channel direction information that is included in the channel information. The transmission signal generator may generate the transmission signal using a data stream to perform a transmission with the generated beamforming vector.

The channel information may include information about an index of a vector that is selected from a plurality of vectors stored in the user terminals. The channel information may also include information about a predetermined number of bits. For example, the user terminals may pre-store the plurality of vectors, identify channel information, and then feed back to the base station an index of each vector corresponding to the channel information. Accordingly, the beamforming vector may be generated using the channel information that is fed back as bit information from each of the user terminals.

The antenna switching unit 230 switches on or off the at least one active antenna among the plurality of transmitting antennas. For example, when the M−L transmitting antennas are determined as active antennas among the M transmitting antennas, the beam generator 220 may generate an M−L dimension transmission signal. The antenna switching unit 230 may switch on the M transmitting antennas so that the M−L active antennas may transmit the transmission signal to the user terminals. In this case, only the M−L active antennas may be switched on among the M transmitting antennas by the antenna switching unit 230 to transmit the transmission signal.

According to an aspect of the invention, a number of active antennas may be variably adjusted based on a power of a transmission signal. Accordingly, it is possible to effectively transmit data without changing a number of bits of feedback data.

Although not shown in FIG. 2, a MIMO communication system according to another aspect of the invention may further include a user terminal selector. The user terminal selector selects a user terminal to be involved in communication among a plurality of user terminals based on channel information. Only a portion of the plurality of user terminals may be substantially involved in communication. For example, the user terminal selector may select only a user terminal corresponding to a channel with a good channel state, based on channel state information. The channel state information includes information about a state of a channel. The user terminal selector may also select the user terminal using a semi-orthogonal user selection (SUS) algorithm or a greedy user selection (GUS) algorithm. In this case, the user terminal selector may set a data transmission rate of a transmission signal.

Figure 3:
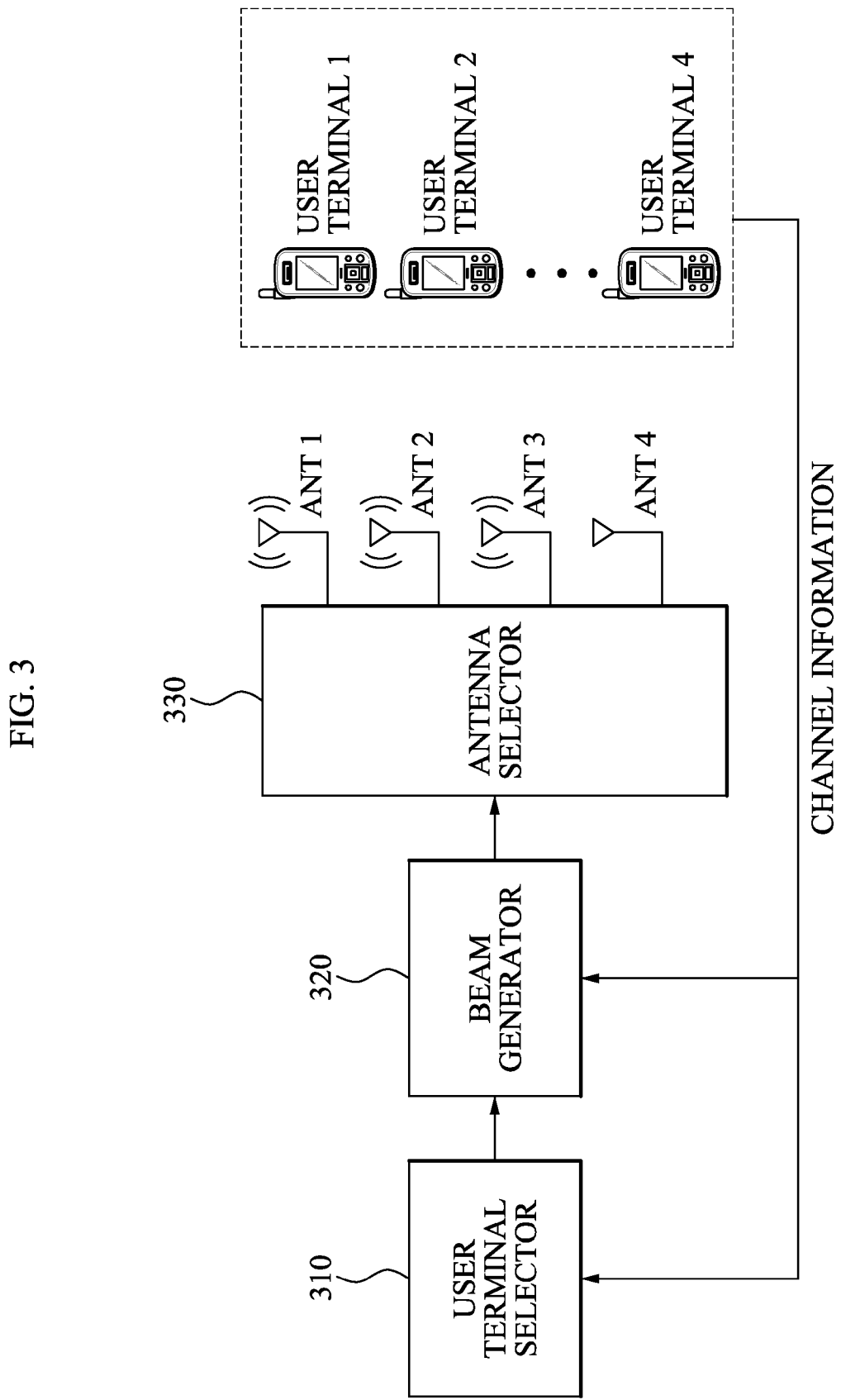
FIG. 3 illustrates another example of a MIMO communication system according to an embodiment of the invention.

FIG. 3 shows another example of a MIMO communication system 300 according to an embodiment of the invention. The MIMO communication system 300 includes a user terminal selector 310, a beam generator 320, an antenna selector 330, a plurality of transmitting antennas, for example, ANT 1, ANT 2, ANT 3, and ANT 4, and a plurality of user terminals, for example, a user terminal 1, a user terminal 2, a user terminal 3 (not shown), and a user terminal 4.

The user terminal selector 310 may receive channel information that is fed back from each of the plurality of user terminals, and may select the user terminals, for example, the user terminal 1, the user terminal 2, and the user terminal 4, to be involved in communication using the fed back channel information. The user terminal selector 310 may select user terminals based on a channel state between a base station and each of the user terminals, or the like.

When the base station uses M transmitting antennas, the user terminal selector 100 may select a maximum of M user terminals to be involved in communication at one time. In this case, when a number of active antennas are reduced to M−L based on a power of a transmission signal, a maximum of M−L user terminals may be involved in the communication.

The beam generator 320 generates a transmission signal to be transmitted to the selected user terminal using the fed back channel information. The beam generator 320 may generate the transmission signal using a data stream and a preceding matrix. As described above with reference to FIG. 2, the beam generator 320 may generate the transmission signal using a beamforming vector corresponding to a number of active antennas.

The beam generator 320 may receive channel information from each of user terminals to be involved in communication. The channel information may include channel state information or channel direction information about a channel vector that is formed between the base station and each of the user terminals.

The beam generator 320 may generate a transmission signal using a zero-forcing beamforming algorithm. When a transmission signal is generated using the zero-forcing beamforming algorithm and the generated transmission signal is transmitted to the user terminals, noise caused by interference between channels may be eliminated. The channel information fed back from each of the user terminals relates to a quantized channel vector. Accordingly, noise caused by interference between channels may still exist. In particular, as the power of the transmission signal or an SNR increases, the noise caused by the interference may significantly increase. The beam generator 320 may include a beamforming vector generator to generate a beamforming vector based on the fed back channel information and a transmission signal generator to generate the transmission signal using the generated beamforming vector.

The antenna selector 330 selects at least one active antenna, for example, three active antennas ANT 1, ANT 2, and ANT 3, from the plurality of transmitting antennas, for example, four transmitting antennas ANT 1, ANT 2, ANT 3, and ANT 4, based on the power of the transmission signal. The selected at least one active antenna transmits the transmission signal. The antenna selector 330 may further take into account the SNR of the transmission signal in addition to the power of the transmission signal when selecting active antennas.

For example, the antenna selector 330 reduces the number of active antennas from four to three when the power of the transmission signal is greater than or equal to a predetermined level. In this case, in comparison to when there are four active antennas, a data transmission rate may be further improved when there are three active antennas. Specifically, when the number of bits of fed back channel information is fixed to a certain value, the number of active antennas may be adjusted and thus the data transmission rate may be improved. For example, if the power of the transmission signal increases again, the antenna selector 330 may select the transmitting antennas ANT 1 and ANT 2 as active antennas. The antenna selector 330 may determine the number of active antennas using the virtual antenna scheme so that the state of the effective channel may be maintained.

Figure 4:
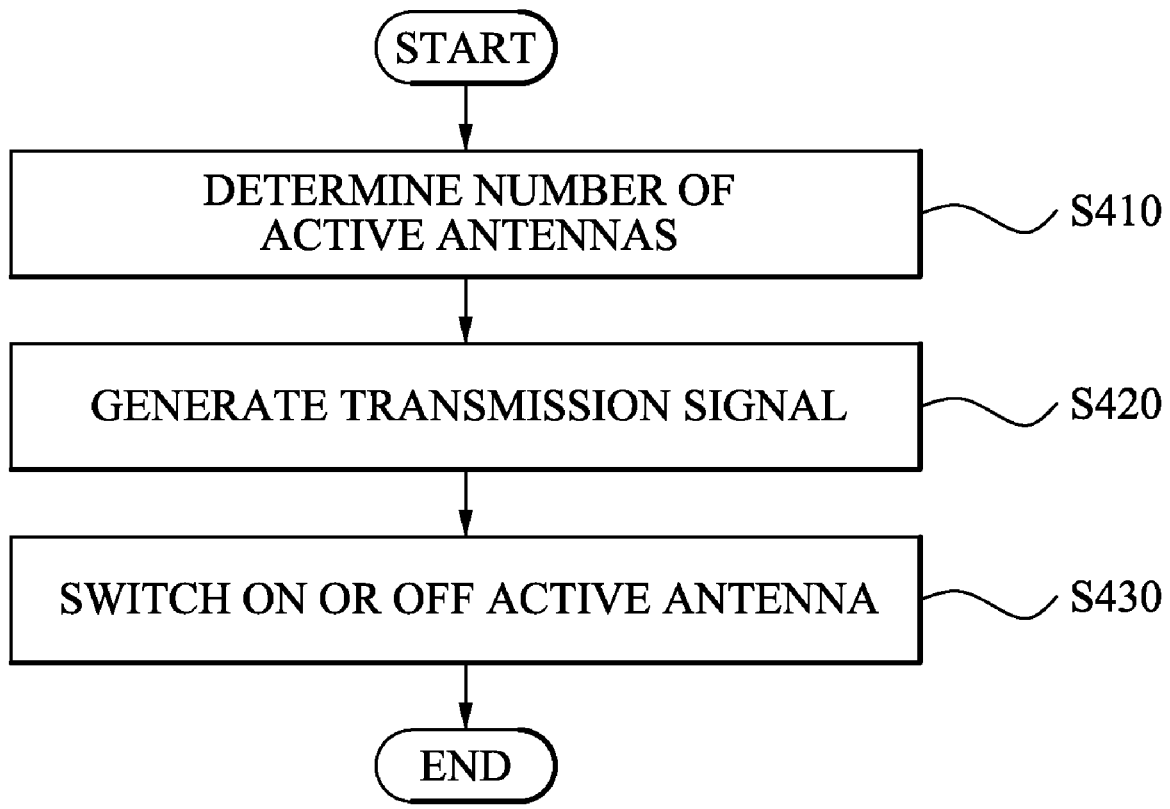
FIG. 4 is a flowchart illustrating a MIMO communication process according to an embodiment of the invention.

FIG. 4 is a flowchart of a MIMO communication process according to an embodiment of the invention. In operation S410, a number of active antennas among a plurality of transmitting antennas is determined based on a power of a transmission signal. There is at least one active antenna and the at least one active antenna transmits the transmission signal. In the addition to the power of the transmission signal, at least one of an SNR, the number of the plurality of user terminals, and a number of bits of the channel information, may also be taken into account when determining the number of active antennas. It is possible to reduce the number of active antennas as the power of the transmission signal increases.

In operation S420, the transmission signal is generated corresponding to the number of active antennas using channel information that is fed back from each of a plurality of user terminals. It is possible to generate the transmission signal using a zero-forcing beamforming algorithm. Operation S420 may include generating a beamforming vector based on the channel information, and generating the transmission signal by using the beamforming vector. In operation S430, the at least one active antenna is switched on or off.

Although not shown in FIG. 4, a MIMO communication process according to an aspect of the invention may further include detecting a power of a transmission signal.

Although not shown in FIG. 4, a MIMO communication process according to other aspects of the invention may further include selecting a user terminal to be involved in communication among the plurality of user terminals, based on the channel information.

Although not shown in FIG. 4, a MIMO communication process according to other aspects of the invention may further include selecting at least one active antenna from transmitting antennas based on the power of a transmission signal, wherein the at least one active antenna transmits the transmission signal, and generating the transmission signal using channel information that is fed back from user terminals. In this case, the number of active antennas may also be determined based on at least one of an SNR, the number of the plurality of user terminals, and a number of bits of the channel information. The active antenna may be selected using a virtual antenna scheme.

Descriptions that are not described related to operations shown in FIG. 4 have been described above with reference to FIGS. 1 through 3 and thus will be omitted here.

Figure 5:
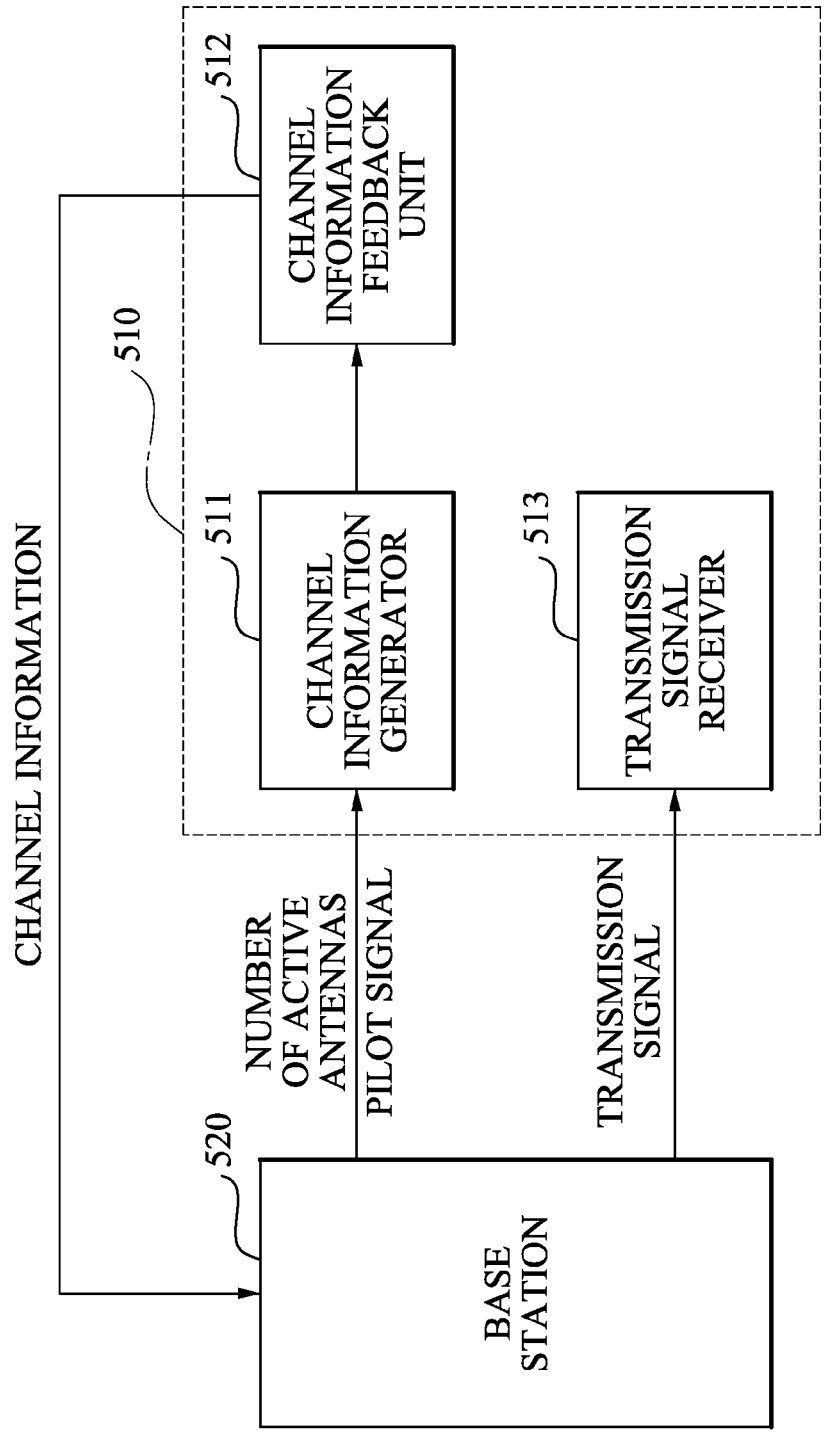
FIG. 5 is a block diagram illustrating a terminal device according to an embodiment of the invention.

FIG. 5 is a block diagram of a terminal device 510 according to an aspect of the invention. The terminal device 510 includes a channel information generator 511, a channel information feedback unit 512, and a transmission signal receiver 513.

The channel information generator 511 generates channel information about a channel based on the number of active antennas. The channel is formed between the terminal device 510 and a base station 520. The channel information generator 511 may select, from at least one pre-stored codebook, an active codebook corresponding to the number of active antennas, and generate the channel information by using the active codebook. The channel information generator 511 may select, from a plurality of vectors, a vector corresponding to the channel that is formed between the terminal device 510 and the base station 520, and generate channel information. The plurality of vectors is included in the active codebook and the channel information includes index information of the selected vector.

As described above, when the number of active antennas changes, the size of the codebook or the size of vectors included in the codebook must be changed according to the number of active antennas. Therefore, for cases where the number of active antennas changes, at least one codebook may be stored in the terminal device 510 to correspond to the number of active antennas.

The base station 520 informs the terminal device 510 of information associated with the determined number of active antennas. The terminal device 510 may select, from the plurality of pre-stored codebooks, an active codebook corresponding to information associated with the number of active antennas. The channel information generator 511 generates channel information using a pilot signal that is received according to the active codebook.

When the base station 520 uses a virtual antenna scheme, the channel information generator 511 may estimate an effective channel, instead of a real channel that is formed between the terminal device 510 and the base station 520. The channel information generator 511 may generate, as channel information, information associated with the estimated effective channel.

The channel information feedback unit 512 feeds back the generated channel information to the base station 520. The channel information may include index information of a vector that is selected from a plurality of vectors included in the active codebook.

The transmission signal receiver 513 receives a transmission signal that is transmitted from the active antenna regarding the channel information. The base station 520 selects a beamforming vector using the fed back channel information, and generates the transmission signal based on the selected beamforming vector. The transmission signal is transmitted from the active antenna. The transmission signal received by the transmission signal receiver 513 may be processed through an interference cancellation process, a decoding process, or the like.

Figure 6:
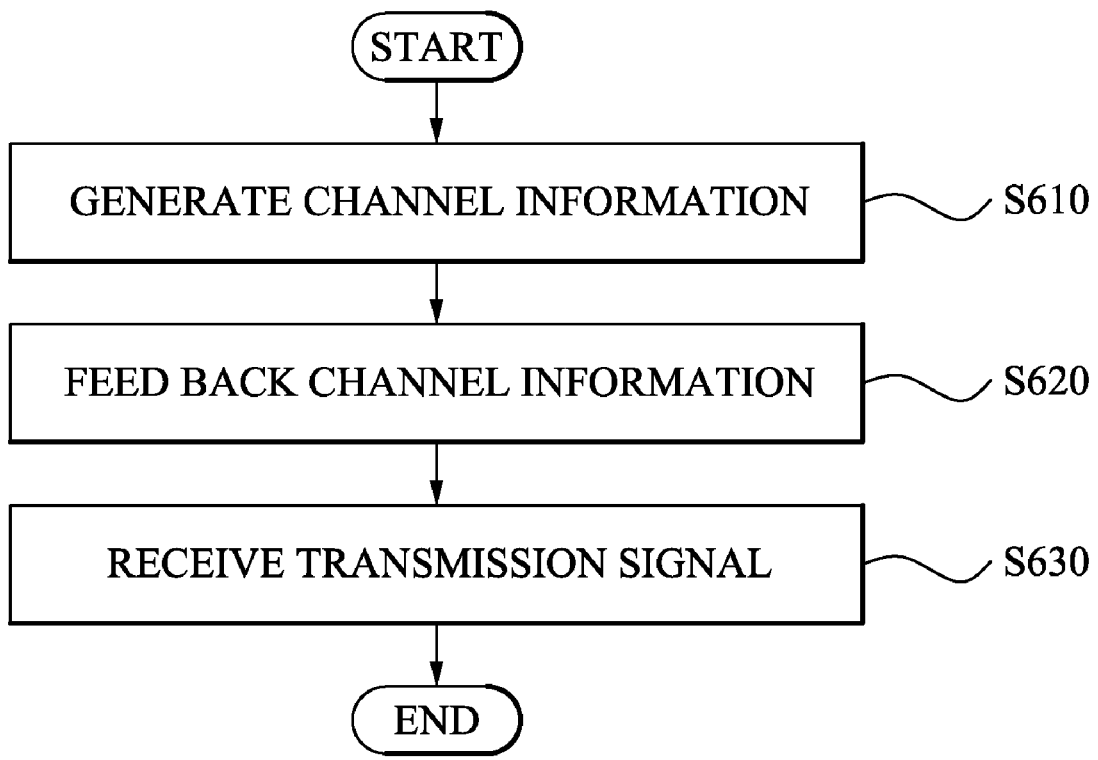
FIG. 6 is a flowchart illustrating a process of receiving transmission according to an embodiment of the invention.

FIG. 6 is a flowchart illustrating a process of receiving a transmission signal according to an embodiment of the invention. In operation S610, channel information about a channel is generated based on the number of active antennas. The channel is formed between a base station and a terminal device. The at least one active antenna is selected from a plurality of transmitting antennas by the base station, based on the power of the transmission signal.

In operation S620, the channel information is fed back to the base station. In operation S630, the transmission signal that is transmitted from the at least one active antenna is received based on the channel information.

Descriptions that are not described related to operations shown in FIG. 6 have been described above with reference to FIGS. 1 through 5 and thus will be omitted here.

Figure 7:
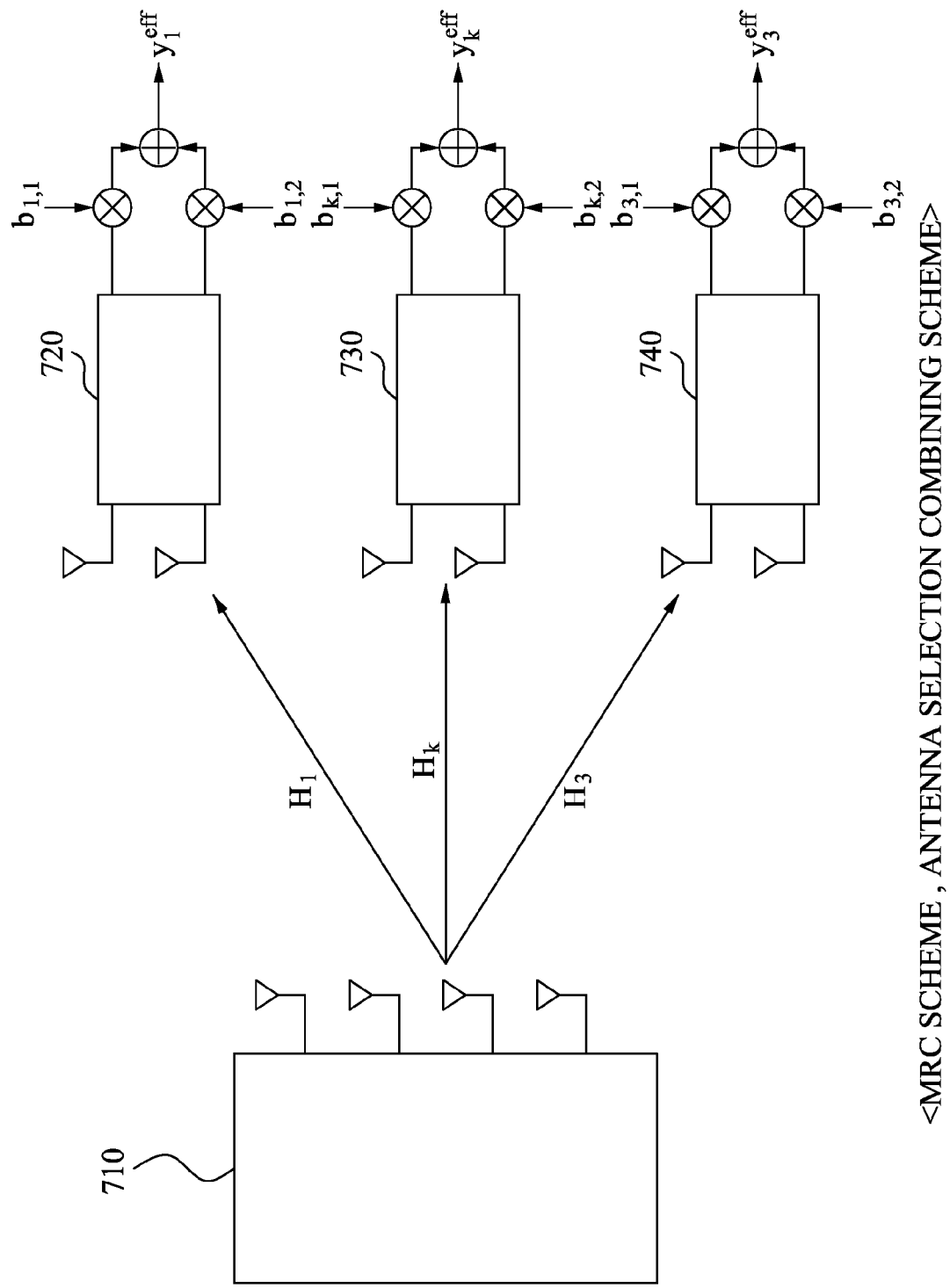
FIG. 7 illustrates terminal devices that use a Maximal Ratio Combining (MRC) scheme or an antenna selection combining scheme according to an embodiment of the invention.

FIG. 7 illustrates terminal devices that use a Maximal Ratio Combining (MRC) scheme or an antenna selection combining scheme according to an embodiment of the invention.

FIG. 7 shows a base station 710 and a plurality of terminal devices 720, 730, and 740. Each of the terminal devices 720, 730, and 740 includes a plurality of receiving antennas and receives signals from each of the antennas.

According to an aspect of the invention, each of the terminal devices 720, 730, and 740 may combine the signals received from the plurality of antennas, using various types of combining schemes.

The various types of combining schemes may include the MRC scheme, the antenna selection combining scheme that selects, from the plurality of receiving antennas, at least one active receiving antenna to thereby combine a signal that is received from the at least one active receiving antenna among the received signals, and a received signal non-combining scheme that considers the signals received from the plurality of received signals, as independent signals.

The MRC scheme and the antenna selection combining scheme will be described with reference to FIG. 7.

When the terminal device 730 is a $k^{th}$ terminal device, a signal $y_{k,l}$ received from an $l^{th}$ receiving antenna of the $k^{th}$ terminal device 730 may be represented by the following Equation 10:

$$y_{k,l} = h_{k,l}^H x + n_{k,l} \quad (10).$$

When the $k^{th}$ terminal device 730 includes N receiving antennas, a combined signal $y_k^{eff}$ that is generated by the signals received from the N receiving antennas may be represented by the following Equation 11:

$$y_k^{eff} = \sum_{l=1}^{N} b_{k,l}^H h_{k,l}^H x + \sum_{l=1}^{N} b_{k,l}^H n_{k,l}, \quad (11)$$

where $b_k$ is a receive weight vector of the $k^{th}$ terminal device 730 and $b_{k,l}$ is an $l^{th}$ element of $b_k$.

In this case, $y_k^{eff}$ of Equation 11 may be represented by the following Equation 12:

$$y_k^{eff} = \sum_{l=1}^{N} b_{k,l}^H h_{k,l}^H x + \sum_{l=1}^{N} b_{k,l}^H n_{k,l} \quad (12)$$

$$= (h_k^{eff})^H x + n$$

$$h_k^{eff} = \sum_{l=1}^{N} b_{k,l} h_{k,l} = H_k b_k,$$

where $h_k^{eff}$ is an effective channel vector of the $k^{th}$ terminal device 730 and $H_k$ is a channel matrix of the $k^{th}$ terminal device 730.

Depending on a scheme used by the $k^{th}$ terminal device 730 among the various types of combining schemes, the receive weight vector $b_k$ and channel information to be fed back to the base station 710 by the $k^{th}$ terminal device 730 may change.

For example, (1) when the $k^{th}$ terminal device 730 uses the MRC scheme, the receive weight vector $b_k$ may be calculated as given by the following Equation 13:

$$m = \arg\max_{i=1,\ldots,2^B} \|H_k^H w_i\|^2 \quad (13)$$

$$b_k = \frac{H_k^H w_m}{\|H_k^H w_m\|}.$$

Specifically, the $k^{th}$ terminal device 730 may calculate $H_k^H w_i$ with changing i from 1 to $2^B$, and may also extract m where $H_k^H w_i$ becomes maximum. The $k^{th}$ terminal device 730 may determine the receive weight vector $b_k$ based on the extracted m and may also combine the signals, received from the N receiving antennas, based on the determined received weigh vector $b_k$.

The $k^{th}$ terminal device 730 may select any one vector from vectors included in a codebook, so that the channel matrix $H_k$ may have a maximum singular value among available singular values of the channel matrix $H_k$. Also, the $k^{th}$ terminal device 730 may feed back index information of the selected vector to the base station 710 as channel direction information (CDI). Here, the index information is quantized information.

(2) When the $k^{th}$ terminal device 730 uses the antenna selection combining scheme, the $k^{th}$ terminal device 730 may select at least one active receiving antenna from the plurality of receiving antennas. The $k^{th}$ terminal device 730 may combine a signal received from the selected at least one active receiving signal, among the signals received from the plurality of receiving antennas.

Specifically, the $k^{th}$ terminal device 730 may calculate the quantization error with respect to the effective channel vector and select the active receiving antenna from the plurality of receiving antennas so that the quantization error may be minimized. The $k^{th}$ terminal device 730 may select the receiving active antenna according to the following Equation 14:

$$e, f = \arg\min_{l=1,\ldots N}\min_{i=1,\ldots,2^B} \sin^2(\angle(h_{k,l}^{eff}, w_i)). \quad (14)$$

Referring to the above Equation 14, the $k^{th}$ terminal device 730 may identify an index e of the active antenna and an index f of the vector that is selected from the vectors included in the codebook, so that the quantization error may be minimized with respect to the effective channel vector.

The $k^{th}$ terminal device 730 may feed back to the base station 710 index information f of the vector that is selected from the vectors included in the codebook. As described above, the index information is the quantized information.

Based on the index e of the active antenna, the $k^{th}$ terminal device 730 may select the receive weight vector $b_k$ as given by the following Equation 15:

$$b_k = \begin{bmatrix} b_{k,1} \\ b_{k,2} \end{bmatrix} \in \left\{ \begin{bmatrix} 1 \\ 0 \end{bmatrix}, \begin{bmatrix} 0 \\ 1 \end{bmatrix} \right\}, \quad (15)$$

where, for convenience of description, it is assumed that N is 2.

Specifically, when the index e of the active antenna is 1, the $k^{th}$ terminal device 730 may select $$\begin{bmatrix} 1 \\ 0 \end{bmatrix}$$

as the receive weight vector $b_k$. When the index e of the active antenna is 2, the $k^{th}$ terminal device 730 may select $$\begin{bmatrix} 0 \\ 1 \end{bmatrix}$$

as the receive weight vector $b_k$.

As described above, that the k$^{th}$ terminal device 730 feeds back channel information to the base station 710 according to the antenna selection combining scheme may be the same as that a terminal device with a single receiving antenna selects any one vector from N×2$^B$ vectors. Accordingly, it is possible to obtain the effect that the codebook size is substantially increased.

Figure 8:
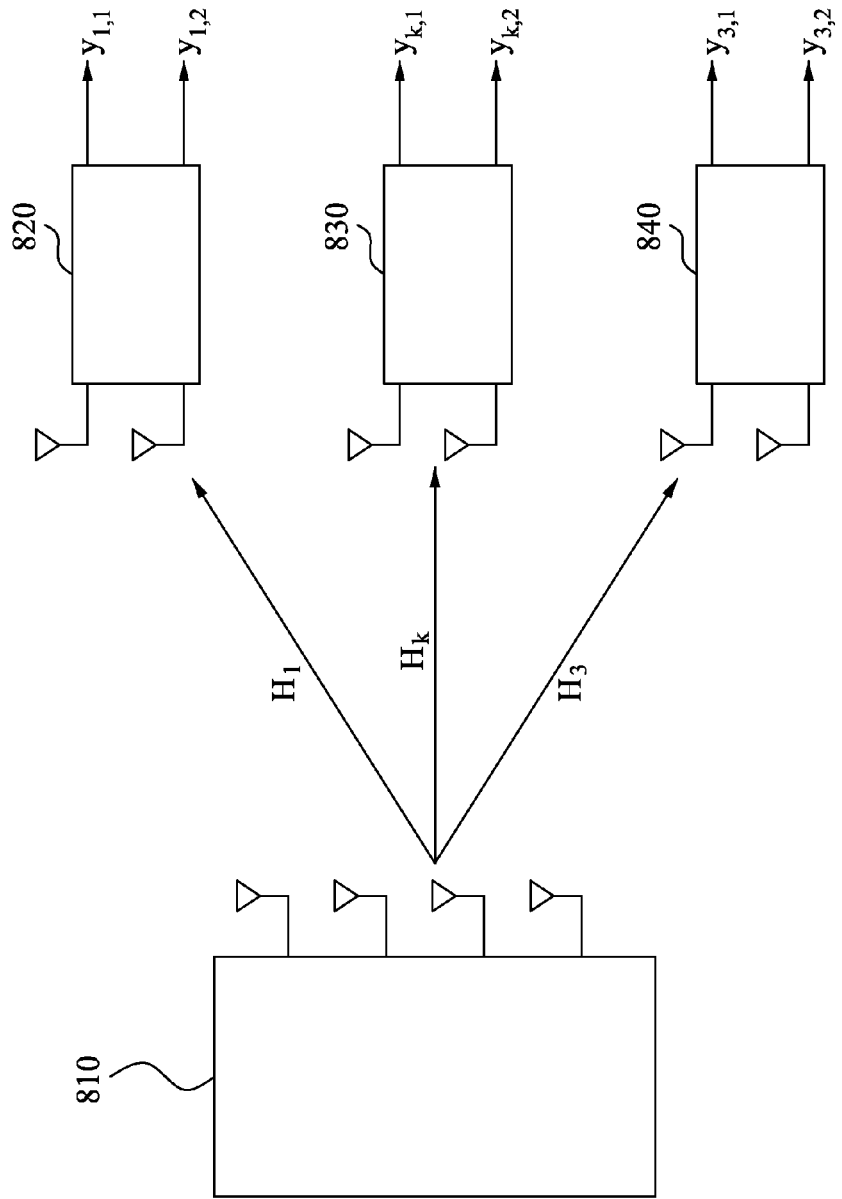
FIG. 8 illustrates terminal devices that use a received signal non-combining scheme according to an embodiment of the invention.

FIG. 8 illustrates terminal devices that use a received signal non-combining scheme according to an embodiment of the invention.

FIG. 8 shows a base station 810 and a plurality of terminal devices 820, 830, and 840.

Each of the terminal devices 820, 830 and 840 feeds back channel information to the base station 810 according to the received signal non-combining scheme. The received signal non-combining scheme may consider signals received from a plurality of receiving antennas, as independent signals.

Since the signals received from the plurality of receiving antennas are considered as the independent antennas, each of the terminal devices 820, 830, and 840 may feed back to the base station 810 channel information about a channel corresponding to each of the receiving antennas.

For example, when the terminal device 830 is a k$^{th}$ terminal device, the k$^{th}$ terminal device 830 may receive $y_{k,l}$ from an l$^{th}$ receiving antenna. Here, for convenience of description, l is 0 or 1. The k$^{th}$ terminal device 830 may feed back to the base station 810 channel information about a channel corresponding to a first receiving antenna and channel information about a channel corresponding to a second receiving antenna.

According to the received signal non-combining scheme, a number of bits of channel information fed back by each of the terminal devices 820, 830, and 840 increases as the number of receiving antennas increases. When each of the terminal devices 820, 830, and 840 includes N receiving antennas, the number of bits of channel information fed back by each of the terminal devices 820, 830, and 840 may increase by N times. The performance of a communication system where each of terminal devices includes N receiving antennas and K terminal devices are provided may be the same as the performance of a communication system that includes (K×N) terminal devices with a single receiving antenna.

The MIMO communication method according to aspects of the invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the invention.

A MIMO communication system and method according to an aspect of the invention can variably determine a number of transmitting antennas based on a power of a transmission signal and thereby can more effectively transmit data.

A MIMO communication system and method according to an aspect of the invention can improve a data transmission rate even when a power of a transmission signal is relatively high.

A MIMO communication system and method according to an aspect of the invention can use a relatively smaller number of transmitting antennas even when an SNR is increased, and thereby can more effectively transmit data.

A MIMO communication system and method according to an aspect of the invention can use a relatively smaller number of transmitting antennas and thereby can improve a data transmission rate and also can use relatively fewer hardware resources.

A MIMO communication system and method according to an aspect of the invention can improve a data transmission rate based on a power of a transmission signal and a number of user terminals even when a number of bits for the feedback of channel information is limited.

A MIMO communication system and method according to an aspect of the invention can generate a transmission signal by using a zero-forcing beamforming algorithm and thereby can provide a communication environment where relatively less interference exists.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A Multiple-Input Multiple-Output (MIMO) communication system comprising:
    an antenna number determination unit to determine a number of active antennas among a plurality of transmitting antennas based on a power of a transmission signal, wherein the number of active antennas is at least one and the at least one active antenna transmits the transmission signal; and
    a beam generator to generate the transmission signal corresponding to the number of active antennas using channel information fed back from each of a plurality of user terminals.

2. The system as claimed in claim 1, further comprising:
    an antenna switching unit to switch on or off the at least one active antenna.

3. The system as claimed in claim 1, wherein the antenna number determination unit determines the number of active antennas based on at least one of a signal-to-noise ratio (SNR), the number of the plurality of user terminals, and a number of bits of the channel information, in addition to the power of the transmission signal.

4. The system as claimed in claim 1, wherein the antenna number determination unit reduces the number of active antennas as the power of the transmission signal increases.

5. The system as claimed in claim 1, wherein the antenna number determination unit determines the number of active antennas using a virtual antenna scheme.

6. The system as claimed in claim 5, wherein the antenna number determination unit determines the number of active antennas using the virtual antenna scheme so that the state of an effective channel is maintained.

7. The system as claimed in claim 1, wherein the beam generator generates the transmission signal using a zero-forcing beamforming algorithm.

8. The system as claimed in claim 1, wherein the beam generator comprises:
a beamforming vector generator to generate a beamforming vector based on the channel information; and
a transmission signal generator to generate the transmission signal using the beamforming vector.

9. A MIMO communication system comprising:
an antenna selector to select at least one active antenna from a plurality of transmitting antennas based on a power of a transmission signal, wherein the at least one active antenna transmits the transmission signal; and
a beam generator to generate the transmission signal using channel information fed back from each of a plurality of user terminals.

10. The system as claimed in claim 9, wherein the antenna selector determines the number of active antennas based on at least one of an SNR, the number of the plurality of user terminals, and a number of bits of the channel information, in addition to the power of the transmission signal.

11. The system as claimed in claim 9, wherein the antenna selector selects the at least one active antenna using a virtual antenna scheme.

12. A terminal device comprising:
a channel information generator to generate channel information about a channel that is formed between the terminal device and a base station, according to a number of at least one active antennas, wherein the at least one active antenna is selected from a plurality of transmitting antennas of the base station based on a power of a transmission signal of the base station;
a channel information feedback unit to feed back the channel information to the base station; and
a transmission signal receiver to receive the transmission signal transmitted from the at least one active antenna based on the channel information.

13. The terminal device as claimed in claim 12, wherein when a plurality of receiving antennas exists, the channel information generator generates the channel information depending on a combining scheme of signals received from the plurality of receiving antennas.

14. The terminal device as claimed in claim 13, wherein the combining scheme of the received signals is any one of a Maximal Ratio Combining (MRC) scheme, an antenna selection combining scheme that selects at least one active receiving antenna from the plurality of receiving antennas to combine a signal received from the at least one active receiving antenna among the received signals, and a received signal non-combining scheme that considers the signals received from the plurality of receiving antennas, as independent signals.

15. The terminal device as claimed in claim 13, wherein the transmission signal receiver combines the received signals based on a receive weight vector corresponding to the combining scheme of the received signals.

16. The terminal device as claimed in claim 12, wherein the channel information generator selects from at least one predetermined codebook an active codebook corresponding to the number of active antennas, and generates the channel information using the active codebook.

17. The terminal device as claimed in claim 16, wherein:
the channel information generator selects, from a plurality of vectors, a vector corresponding to the channel, and generates the channel information; and
the vectors are included in the active codebook and the channel information includes index information of the vector.

18. A MIMO communication method comprising:
determining a number of active antennas among a plurality of transmitting antennas based on a power of a transmission signal, wherein the number of active antennas is at least one and the at least one active antenna transmits the transmission signal;
generating the transmission signal corresponding to the number of active antennas using channel information fed back from each of a plurality of user terminals; and
switching on or off the at least one active antenna among the transmitting antennas.

19. The method as claimed in claim 18, wherein the determining of the number of active antennas comprises determining the number of active antennas based on at least one of an SNR, the number of the plurality of user terminals, and a number of bits of the channel information, in addition to the power of the transmission signal.

20. The method as claimed in claim 18, wherein the determining of the number of active antennas comprises determining the number of active antennas using a virtual antenna scheme.

21. A MIMO communication method comprising:
selecting at least one active antenna from a plurality of transmitting antennas based on a power of a transmission signal wherein the at least one active antenna transmits the transmission signal; and
generating the transmission signal using channel information fed back from each of a plurality of user terminals.

22. The method as claimed in claim 21, wherein the selecting of the at least one active antenna comprises determining the number of active antennas based on at least one of an SNR, the number of the plurality of user terminals, and a number of bits of the channel information, in addition to the power of the transmission signal.

23. The method as claimed in claim 21, wherein the selecting of the at least one active antenna selects the at least one antenna using a virtual antenna scheme.

24. A method of receiving a transmission signal, the method comprising:
generating channel information about a channel that is formed between a terminal device and a base station based on a number of active antennas, wherein at least one active antenna is selected by the base station based on a power of the transmission signal;
feeding back the channel information to the base station; and
receiving the transmission signal that is transmitted from the at least one active antenna according to the channel information.

25. The method as claimed in claim 24, wherein when a plurality of receiving antennas exists, the generating generates the channel information depending on a combing scheme of signals received from the plurality of receiving antennas.

26. A Multiple-Input Multiple-Output (MIMO) communication system comprising:
a base station to select at least one active antenna based on a power of a transmission signal and to transmit data via the transmission signal and the at least one active antennas; and
a plurality of user terminals to receive the data and to feed back channel information to the base station based on the transmission signal.

27. The MIMO communication system of claim 26, wherein each of the plurality of user terminals generates the channel information based on the information about the at least one active antenna.

28. A base station for use in a Multiple-Input Multiple-Output (MIMO) communication system, the base station comprising:

a plurality of antennas to communicate with a plurality of user terminals;

a beam generator to generate a transmission signal based on channel information received from the plurality of user terminals; and an antenna selector to select at least one of the plurality of antennas to transmit the transmission signal based on the power of the transmission signal.

29. The base station of claim 28, wherein the antenna selector reduces the number of selected antennas as the power of the transmission signal increases so as to improve a data transmission rate.

* * * * *